No. 687,459. Patented Nov. 26, 1901.
C. JACOBSON.
FRICTION CLUTCH.
(Application filed July 28, 1900.)
(No Model.) 3 Sheets—Sheet 1.
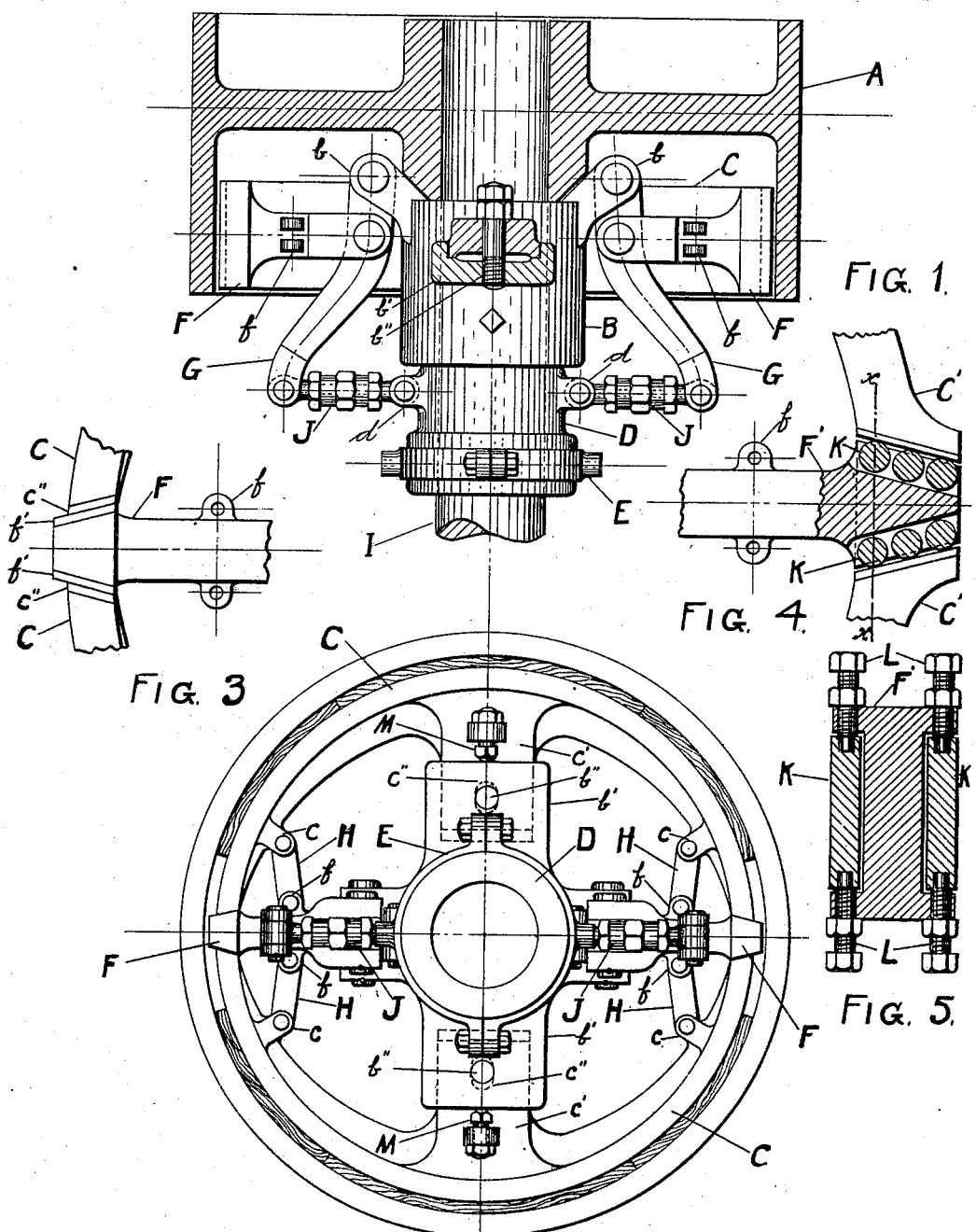
WITNESSES:
INVENTOR
Charles Jacobson
BY
T. Walter Fowler
his ATTORNEY.

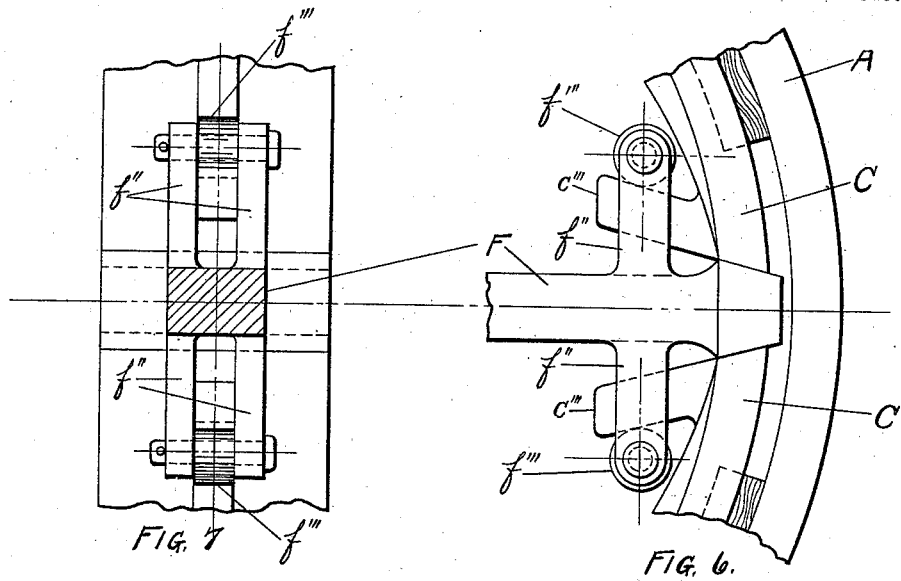

No. 687,459. Patented Nov. 26, 1901.
C. JACOBSON.
FRICTION CLUTCH.
(Application filed July 28, 1900.)

(No Model.) 3 Sheets—Sheet 3.

WITNESSES
C. N. Fowler
Lowell Butte

INVENTOR
Charles Jacobson
BY
P. Walter Fowler
his ATTORNEY.

UNITED STATES PATENT OFFICE.

CHARLES JACOBSON, OF WARREN, PENNSYLVANIA.

FRICTION-CLUTCH.

SPECIFICATION forming part of Letters Patent No. 687,459, dated November 26, 1901.

Application filed July 28, 1900. Serial No. 25,150. (No model.)

*To all whom it may concern:*

Be it known that I, CHARLES JACOBSON, a citizen of the United States, residing at Warren, in the county of Warren and State of Pennsylvania, have invented new and useful Improvements in Friction-Clutches, of which the following is a specification.

This invention relates to friction-clutches of the expansible-segment type adapted to frictionally engage a loose pulley, and thereby connect it with a driving-shaft; and my invention consists of the parts and the constructions and combinations of parts, as I will hereinafter describe and claim.

The essential object of the invention is to improve the working action of such clutches and to secure more positive gripping and releasing functions and to simplify the construction and increase the efficiency of the pulley by increasing its surface of contact between the pulley and the clutch.

Figures 9, 10:
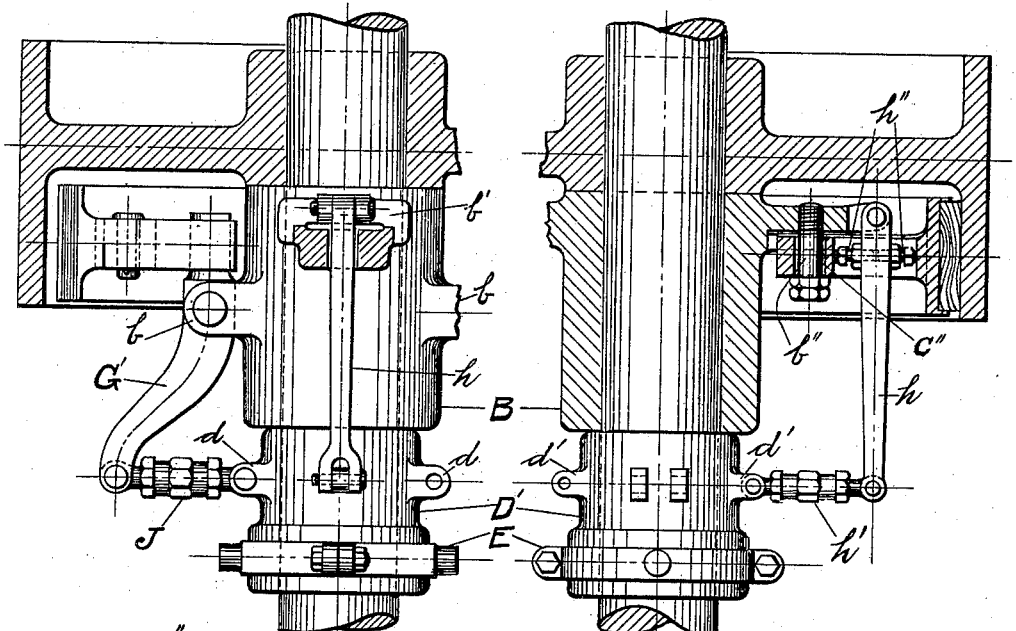
Figure 11:
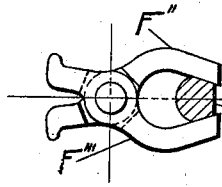
Figure 8:
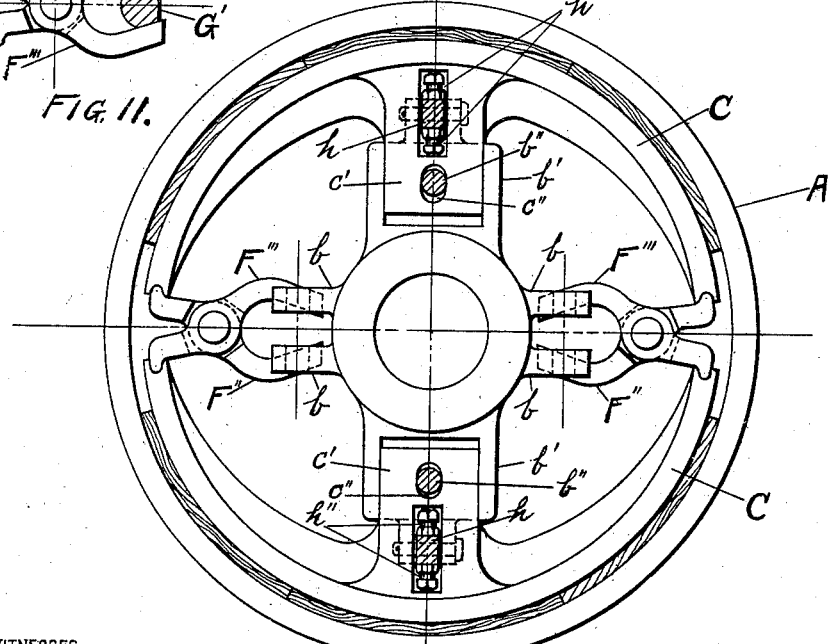

In the accompanying drawings, in which similar letters of reference indicate corresponding parts, Figure 1 is a plan view, partially in section, of a friction-clutch and pulley embodying my invention. Fig. 2 is an end view of Fig. 1. Fig. 3 is a detail of a wedge for forcing the clutch-segments against the inner periphery of the pulley and showing friction-plates on the contacting faces of the parts. Fig. 4 is a part elevation and part section of a wedge provided with transverse grooves or channels and rollers rotatively mounted therein. Fig. 5 is a sectional view on the line $xx$ of Fig. 4. Fig. 6 is an enlarged detail of a portion of the pulley and segments and showing a wedge with lateral arms having rollers engaging inclined lugs on the segments for drawing the segments away from the pulley when the wedge is withdrawn. Fig. 7 is an end view of Fig. 6. Fig. 8 is an end view of the pulley, showing a clutch mechanism of modified form and embodying my invention. Figs. 9 and 10 are plan views, partially in section and one taken at right angles to the other, of the clutch shown in Fig. 8. Fig. 11 is a detail of the jaws $F'''$ to be hereinafter referred to.

In Fig. 1 the pulley A is loosely fitted upon the shaft I, so as to freely revolve thereon, said shaft having fixedly secured to it a spider B, which forms a member of the clutch and which includes in its construction the grooved or channeled arms $b'$, forming guides for corresponding arms $c'$, projecting inwardly from the expansible segments C, to be hereinafter described, said spider being also formed with ears or lugs $b$, to which one end of the levers G are fulcrumed, as shown in Fig. 1. The expansible segments are of the usual general type, forming jointly a divided ring, and their outer surfaces are faced with wood or other appropriate material, forming shoes adapted to frictionally engage and act upon the inner periphery of the pulley. The arms $c'$ are carried by the segments and are slidably guided in the channeled or grooved arms of the spider, and said arms $c'$ are formed with slots $c''$ to receive pins or bolts $b''$, fixed to the arms of the spider, as shown in Fig. 1, whereby provision is made for the proper guided movements of the segments C. On the driving-shaft I is slidably mounted a collar D, formed with ears or lugs $d$ and movable longitudinally along the shaft by means of a yoke E, which may be operated by any well-known form of shifting lever (not shown) or by the mechanism shown and which I will hereinafter describe. To the lugs or ears $d$ of the collar one end of adjustable links J is pivotally secured, the outer ends of said links being pivotally secured to the adjacent ends of the fulcrumed levers G before mentioned, whereby when the collar is moved inwardly along the shaft the levers are forced outwardly toward the inner periphery of the pulley and when said collar is moved outwardly on the shaft the levers are drawn inwardly, the levers in both instances swinging about their fulcrumed connection with the lugs $b$ on the spider. At points between their opposite ends the levers G in Figs. 1 and 2 are pivotally connected with the forked inner end of the shanks or stems of the wedges F, which are designed to enter the space between the adjacent ends of the segments to cause the latter to expand and approach and frictionally engage the inner periphery of the pulley A, whereby the pulley is made to revolve with the driving-shaft. If preferred, the wedge may be fitted with friction-plates $f''$, adapted to engage corresponding plates $c''$, fitted to the ends of the segments C, as shown in Fig. 3, whereby the friction and the wear of the contacting parts are much reduced. The shanks or stems of the wedges are also formed or provided with lugs or ears $f$ or means for pivotally connecting their opposite sides with the inner ends of transversely-extending links H, whose outer ends are also pivotally connected with lugs or ears $c$ on the inner periphery of the segments C, as shown in Fig. 2, said links H serving as one of the means shown for positively drawing the segments out of frictional contact with the pulley simultaneously with the withdrawal of the wedges from between the ends of the segments.

In Fig. 2, M M are set screws or stops for preventing one segment C from being drawn too far away from the inner periphery of the pulley and allowing the other to remain in contact with it.

In Figs. 4 and 5 I illustrate another form of wedge and one which is specially effective. In these figures the wedge is shown as recessed above and below to form grooves or channels adapted to receive rollers K, whose end portions have bearings to receive journals on the inner ends of threaded bolts L, engaging threaded openings formed in the sides of the wedge, as shown in Fig. 5, whereby the rollers are removably secured and held out of direct contact with the walls of the recesses they occupy, said rollers serving to reduce the friction, and consequently the wear, between the wedge and the ends of the segments.

From the foregoing description and a reference to the aforesaid figures it will be apparent that when the collar D is pushed along the shaft toward the spider the adjustable links J operate to force the connected ends of the levers G outwardly and away from the center of the shaft I, this action resulting in the wedges being forced between the separated ends of the segments, thereby expanding the segments and causing their frictional surfaces to tightly grip the inner periphery of the pulley and securing the latter, so that it rotates with the driving-shaft. Upon a reverse movement—namely, sliding the collar outwardly along the shaft I and away from the spider—the links J move the levers inward and withdraw the wedges, and simultaneously with this inward movement of the wedges the stems or shanks of the latter pull upon the links H, and thereby cause the latter to positively withdraw the segments out of frictional contact with the pulley and release said pulley from its fixed connection with the driving-shaft, whereby the pulley ceases to revolve.

In Figs. 6 and 7 the wedge for forcing the clutch-segments C against the inner periphery of the pulley A is formed with laterally-extending forked or spaced arms or lugs $f'''$, within the outer ends of which rollers $f''''$ are mounted, and from the inner faces of the segments inclined lugs $C'''$ project and pass between the separated arms or lugs $f'''$, so that the rollers of the latter ride upon the inclined surfaces, whereby when the wedge is withdrawn the rollers are caused to ride up the inclined surfaces of the lugs $C'''$, and thereby draw the segments away from their contact with the pulley, this operation being substantially the same as that performed by the links H. (Shown in Fig. 2.)

In Figs. 8, 9, and 10 the main portions of the device are like those shown in the other figures and previously described and are given the same reference-letters. The construction shown in said figures is especially desirable for large pulleys and where great power is required. In this instance I show a pair of jaws $F''$ $F'''$, pivoted together at their point of crossing substantially in the manner of a pair of shears, their outer ends or short arms being disposed between the adjacent ends of the segments to spread or force apart the segments when the long arms of the jaws are separated, which latter movement is accomplished by the upper wedge-shaped ends of the levers $G'$, which are shaped to fit between the jaws. In this instance the levers $G'$ are fulcrumed between their ends to the lugs $b$ instead of at one end, as shown in Figs. 1 and 2. In connection with the levers $G'$ in Figs. 8, 9, and 10 I use levers $h$, which are fulcrumed at one end to lugs on the guides $b'$ and have their opposite ends connected with adjustable links $h'$, which are in turn connected with lugs $d'$ on the collar D. As a means for adjusting the levers $h$ I employ set-screws $h''$, which enable me to move and adjust the levers in the slots in the arms $c'$, which work in the channeled or grooved arms $b'$, before described. It will be understood from this description that when the collar $D'$ in Figs. 8, 9, and 10 is moved outwardly along the shaft the outer ends of the levers $h$ will be pulled toward the shaft and accordingly draw the segments away from the inner periphery of the pulley.

Having thus described my invention, what I claim as new, and desire to secure by Letters Patent, is—

1. The combination with a driving-shaft and a pulley loose thereon, of a frictional clutch including segments and means for expanding the same to cause them to frictionally engage with and lock the pulley to the shaft, and links pivotally connected with the expanding means and segments and operated by the former for positively withdrawing the segments to release the pulley from its fixed connection with the shaft.

2. The combination with a driving-shaft and a pulley loose thereon, of a spider fixed to the shaft and having grooved or channeled arms, segments having arms slidably fitted to the arms of the spider, a collar slidable on the shaft, levers fulcrumed at one end to the spider and adjustable links pivotally connecting the opposite ends of the levers to the collar, wedges connected with the levers at points between the opposite ends of the latter, and adapted to enter between and expand the segments, and links pivotally connecting the wedges with opposite segments and serving to withdraw the segments upon the withdrawal of the wedges.

3. The combination with the driving-shaft, a pulley loose thereon, a collar slidable on the shaft and a yoke for operating the collar, of a spider having channeled or grooved arms provided with pins or studs, segments having arms slidably engaging the channels of the first-named arms, and provided with slots for the pins or studs of the latter, said spider provided with lugs or ears, levers fulcrumed to said lugs or ears, and an adjustable link connection between the opposite ends of said levers and the collar, wedges adapted to enter the space between and expand said segments, said wedges having shanks or stems pivotally connected with said levers at points between the ends of the latter, and a pivoted link connection between each side of the shank or stem of the wedge and the adjacent segment whereby the withdrawal of the wedges causes the pivoted link connections to positively move the segments away from the pulley.

4. The combination of a shaft, a pulley loose thereon, expansible segments to grip the pulley and fix it to the shaft, wedges for expanding the segments, means for operating the wedges, and roller-bearings between the wedges and ends of the segments said bearings consisting of recesses in one of said parts, rollers rotatively mounted in said recesses, and threaded bolts having journal ends upon which the rollers are mounted.

5. The combination with a driving-shaft and a pulley loose thereon, of a friction-clutch including segments and means for expanding the same to cause them to frictionally engage with and hold the pulley to the shaft, and connections independent of and carried by the expanding means for positively withdrawing the segments simultaneously with the withdrawal of said expanding means.

6. The combination of a driving-shaft, a pulley loose thereon, a collar slidable on said shaft, segments for gripping and releasing the pulley, a lever mechanism and adjustable links connecting one end of the same with the collar, a wedge mechanism between the lever mechanism and the segments for expanding the latter, inwardly-projecting lugs on the segments and mechanism engaging the same and operated by and in unison with the collar and wedge mechanism for positively withdrawing the segments simultaneously with the release of the wedge mechanism.

7. The combination with a shaft, a loose pulley thereon and segments to grip and release said pulley, and means for expanding the segments, of means independent of, and carried by, the expanding means, for positively withdrawing the segments simultaneously with the withdrawal of the expanding means, and stops by which the extent of the withdrawal of the segments is regulated.

In testimony whereof I have hereunto set my hand in presence of two subscribing witnesses.

CHARLES JACOBSON.

Witnesses:
NELLIE S. BESHLIN,
ARCHIE SHUTT.